(12) United States Patent
De Isla Puga et al.

(10) Patent No.: US 8,500,935 B2
(45) Date of Patent: Aug. 6, 2013

(54) METHOD OF MAKING A TUBE USING A CYLINDER AIR COOLED HEAT WELDER

(75) Inventors: Daniel De Isla Puga, Tijuana (MX); Eugenia Galvan, Tijuana (MX); Jesus Marquez, Tijuana (MX); Jose Luis Sandoval, Tijuana (MX); Juan Carlos Rodriguez, Tijuana (MX); Victor Flores, Tijuana (MX)

(73) Assignee: Plantronics, Inc., Santa Cruz, CA (US)

( * ) Notice: Subject to any disclaimer, the term of this patent is extended or adjusted under 35 U.S.C. 154(b) by 275 days.

(21) Appl. No.: 13/011,651

(22) Filed: Jan. 21, 2011

(65) Prior Publication Data

US 2012/0186734 A1 Jul. 26, 2012

(51) Int. Cl.
*B29C 53/46* (2006.01)
(52) U.S. Cl.
USPC .......................................................... 156/218

(58) Field of Classification Search
None
See application file for complete search history.

(56) References Cited

U.S. PATENT DOCUMENTS

| | | | | |
|---|---|---|---|---|
| 2,187,431 A | * | 1/1940 | Powell | 29/890.08 |
| 4,769,102 A | * | 9/1988 | Neumuller et al. | 156/359 |
| 7,846,287 B2 | * | 12/2010 | Bergsma et al. | 156/218 |

* cited by examiner

*Primary Examiner* — Barbara J Musser
(74) *Attorney, Agent, or Firm* — Michael D. Rodriguez

(57) ABSTRACT

A method of welding a thermoplastic sheet, having a first side and a second side, into a cylinder, the method comprising the steps of folding the thermoplastic sheet into a cylinder such that the first side and the second side overlap, positioning the thermoplastic sheet in a cylinder tube having a longitudinal opening such that the overlapping portions of the first and second sides of the thermoplastic sheet are aligned with the longitudinal opening, and activating a heat welder so that a press of the heat welder moves into the longitudinal opening of the cylinder tube and presses the thermoplastic sheet against an opposing surface to weld the overlapping portions of the first and second sides.

9 Claims, 5 Drawing Sheets

US 8,500,935 B2

METHOD OF MAKING A TUBE USING A CYLINDER AIR COOLED HEAT WELDER

FIELD OF INVENTION

The present invention relates to plastic cylinders made from thermoplastic sheets and more particularly, to a method and apparatus for welding a sheet of thermoplastic into a cylinder shape.

BACKGROUND OF THE INVENTION

Within the packaging industry, there is a desire to produce packaging in which the packaged product may be viewed 360 degrees through the clearest and cleanest thermoplastic packaging finish. With the dramatic increase in consumer electronics by various companies over the past decade, the competition to draw the consumer's attention to one's product on the shelf has become fierce. Companies are constantly looking for a competitive advantage in marketing their products over their competitors. A package with a 360 degree view of the product allows the consumer to fully inspect the product from all angles and gives the consumer more information in their decision to purchase the product.

SUMMARY OF THE INVENTION

According to one aspect of the invention, provided is a method of welding a thermoplastic sheet, having a first side and a second side, into a cylinder, the method comprising the steps of folding the thermoplastic sheet into a cylinder such that the first side and the second side overlap, positioning the thermoplastic sheet in a cylinder tube having a longitudinal opening such that the overlapping portions of the first and second sides of the thermoplastic sheet are aligned with the longitudinal opening, and activating a heat welder so that a press of the heat welder moves into the longitudinal opening of the cylinder tube and presses the thermoplastic sheet against an opposing surface to weld the overlapping portions of the first and second sides. The method may further comprise injecting cooling air through the cylinder tube while the thermoplastic sheet is pressed against the opposed surface for welding. The time of injecting cool air may be one to ten seconds. The opposing surface may be heated and more specifically heated to 250 degrees Fahrenheit to 750 degrees Fahrenheit. The opposing surface may also include a polytetrafluoroethylene (PTFE) primer layer. The thermoplastic sheet may be polyethylene terephthalate (PET), polyethylene terephthalate glycol (PETG), polyethylene terephthalate glycol recycling (PETGR), polyethylene terephthalate glycol recycling glycol (PETGRG), or other similar thermoplastic that can be welded together with heat. The longitudinal opening of the cylinder tube may be the length of the cylinder tube and a width larger than the width of the press. The press may press the thermoplastic sheet against the heated surface for one to twenty seconds.

According to another aspect of the invention, provided is a welding apparatus for welding a thermoplastic sheet, having a first side and a second side and in which the first side and second side overlap, into a cylinder comprising a support member for applying heat to the thermoplastic, a cylinder tube having a longitudinal opening for positioning the thermoplastic sheet in the cylinder tube such that the overlapping of the first and second sides of thermoplastic sheet are aligned with the longitudinal opening, a pressure element moving into the longitudinal opening for exerting pressure onto the thermoplastic against the support member, and a frame to support the support member and for guiding the pressure element onto the thermoplastic. The longitudinal opening of the cylinder tube may be the length of the cylinder tube and may have a width larger than the width of the press. The support member may house a resistance member for heating the support member. The support member may be heated to 250 degrees Fahrenheit to 750 degrees Fahrenheit. The apparatus may also comprise a cooling element for injecting cool air through the cylinder tube while the thermoplastic sheet is pressed against the support member for welding. The time of injecting cool air may be one to ten seconds. The support member may be a flat surface and may include includes a polytetrafluoroethylene (PTFE) primer layer. The thermoplastic sheet is polyethylene terephthalate (PET), polyethylene terephthalate glycol (PETG), polyethylene terephthalate glycol recycling (PETGR), polyethylene terephthalate glycol recycling glycol (PETGRG), or other similar thermoplastic that can be welded together with heat.

DETAILED DESCRIPTION OF THE DRAWINGS

A method of welding a thermoplastic sheet into a cylinder shape is disclosed. The following description is presented to enable an ordinarily skilled person in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For the purpose of clarity, material that is known in the technical fields related to the invention has not been described in detail so as not to unnecessarily obscure the present invention.

Figure 1:
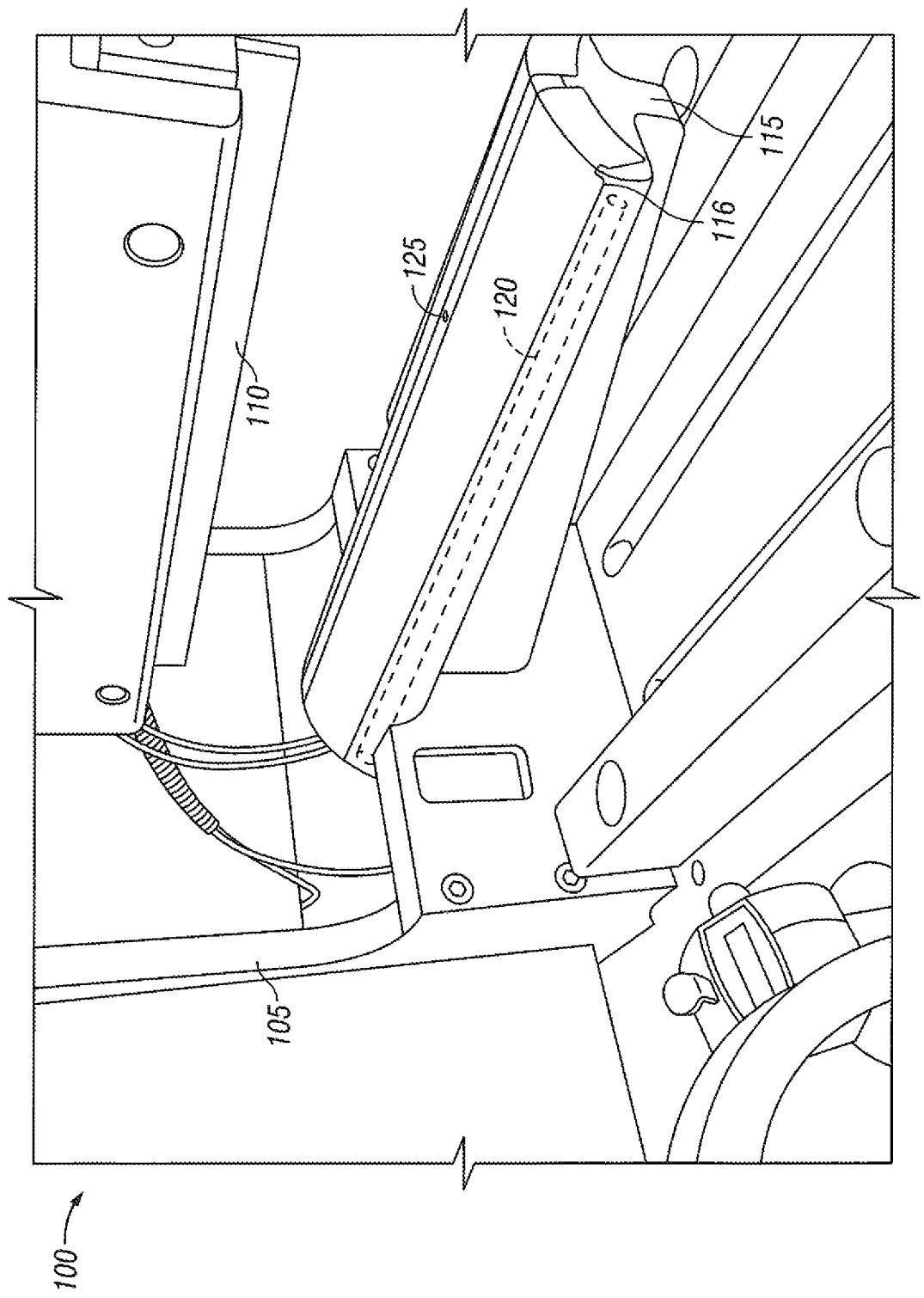
FIG. 1 illustrates a welding apparatus 100, according to an embodiment of the invention.

FIG. 1 illustrates a welding apparatus 100, according to one embodiment of the invention. The welding apparatus 100 comprises a frame 105, a press 110, a support member 115, a surface 116, a resistance element 120, and a cooling element 125.

The welding apparatus 100 provides a method for welding a thermoplastic sheet 300 (not shown) into a cylinder shape. The welding device 100 includes a frame 105 to support the press 110 and the support member 115. The support member 115 has a slightly curved upper surface 116 and includes a polytetrafluoroethylene (PTFE) primer layer. When the welding apparatus 100 is activated, the support member 115 is heated by a resistance element 120 located in the support member 115 under the surface 116. Once the surface 116 is heated, the press 110 descends down onto the thermoplastic sheet 300 and presses the thermoplastic sheet 300 against the support member 115. The press 110 may press down onto the thermoplastic sheet 300 for one to twenty seconds based on the thermoplastic sheet's 300 thickness. While the thermoplastic sheet 300 is pressed against the heated surface 116 of the support member 115, the cooling element 125 injects cool air for one to ten seconds. Once cooled, the thermoplastic sheet 300 is removed.

Figure 2:
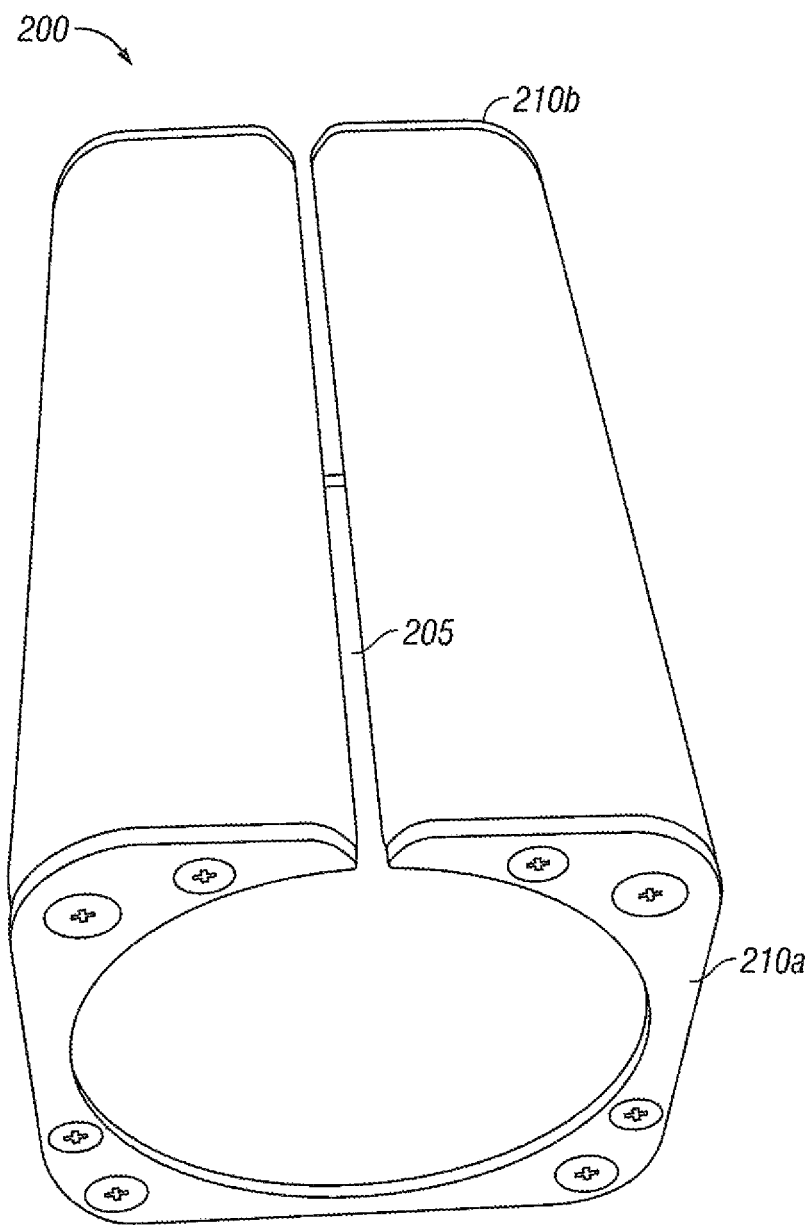
FIG. 2 illustrates a cylinder tube 200, according to an embodiment of the invention.

FIG. 2 illustrates a cylinder tube 200, according to one embodiment of the invention. The cylinder tube 200 may be made of polyoxymethylene, commonly known under the trade name Delrin. The cylinder tube 200 comprises a longitudinal opening 205 for positioning the thermoplastic sheet 300 (not shown) in the cylinder tube 200 such that the overlapping of the first and second sides of the thermoplastic sheet 300 are aligned with the longitudinal opening 205 so that the press 110 may move into the longitudinal opening for exerting pressure onto the thermoplastic sheet 300 against the support member 115. To keep the cylinder tube 200 from deforming and affecting the internal diameter, the front and the back of the cylinder tube 200 is supported by a cylinder support structure 210. The cylinder support structure 210 may be an aluminum plate.

Figure 3:
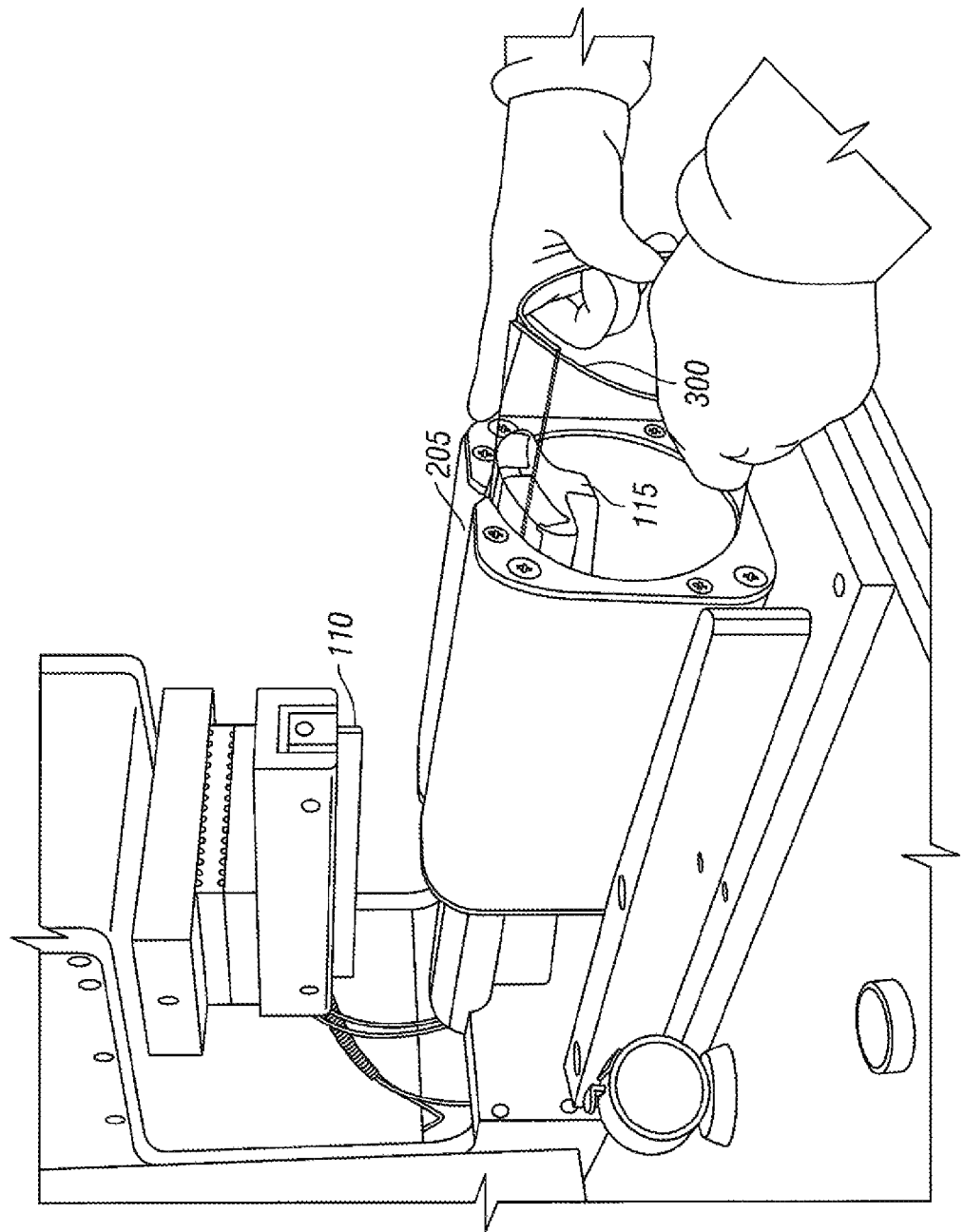
FIG. 3 illustrates the cylinder tube 200 shown in FIG. 2 coupled to the welding apparatus 100 shown in FIG. 1.

FIG. 3 illustrates the cylinder tube 200 shown in FIG. 2 coupled to the welding apparatus 100 shown in FIG. 1. As mentioned above, the thermoplastic sheet 300 is positioned in the cylinder tube 200 such that the overlapping of the first and second sides of the thermoplastic sheet 300 are aligned with the longitudinal opening 205 of the cylinder. The thermoplastic sheet is polyethylene terephthalate (PET). However, polyethylene terephthalate glycol (PETG), polyethylene terephthalate glycol recycling (PETGR), polyethylene terephthalate glycol recycling glycol (PETGRG), or other similar thermoplastic that can be welded together with heat may be used. The longitudinal opening 205 of the cylinder tube 200 in turn is aligned with the press 110 so that the press 110 may move into the longitudinal opening 205 of the cylinder tube 200 and press the thermoplastic sheet 300 against the heated surface 116 of the support member 115. The support member 115 houses a resistance member 120 for heating the surface 116 of the support member 115. For optimal welding of the first and second side of the thermoplastic sheet 300, the surface 116 may be heated to 250 degrees Fahrenheit to 750 degrees Fahrenheit. While the thermoplastic sheet 300 is pressed against the heated surface 116 of the support member 115, the cooling element 125 injects cool air into the cylinder tube 200 for one to ten seconds. Once cooled, the thermoplastic sheet 300 is removed from the cylinder tube 200.

Figure 4:
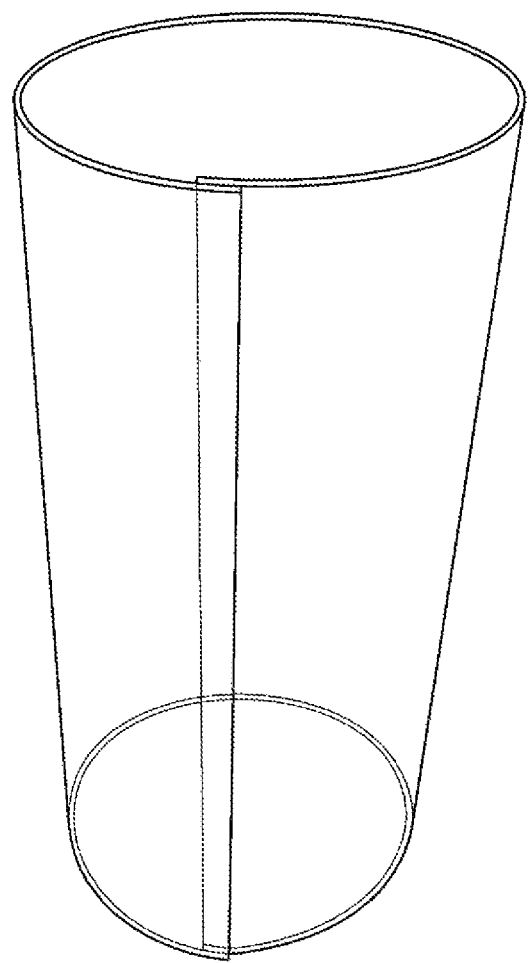
FIG. 4 illustrates a thermoplastic sheet welded into a cylinder.
Figure 5:
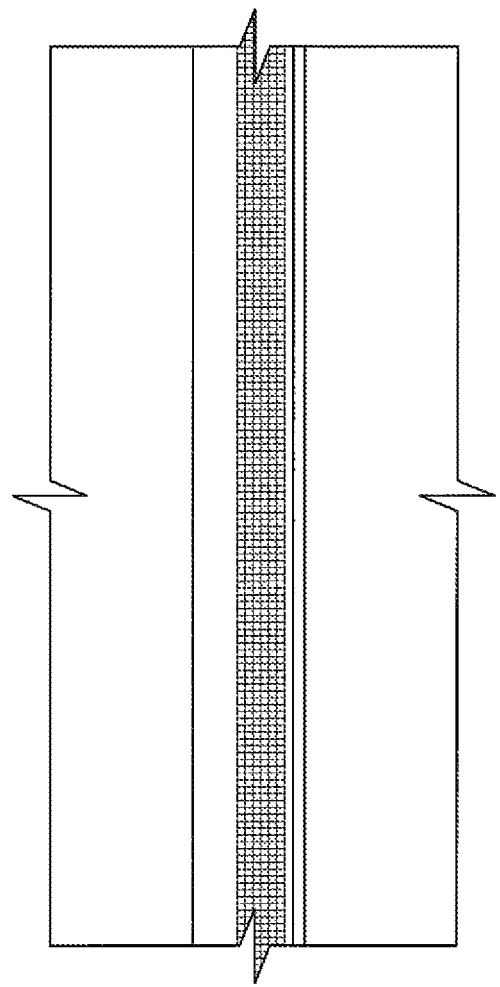
FIG. 5 illustrates a close up of the welded section of the thermoplastic sheet shown in FIG. 4.

FIG. 4 illustrates the thermoplastic sheet 300 welded into a cylinder and FIG. 5 illustrates a close up of the welded section of the thermoplastic sheet 300 shown in FIG. 4.

Figure 6:
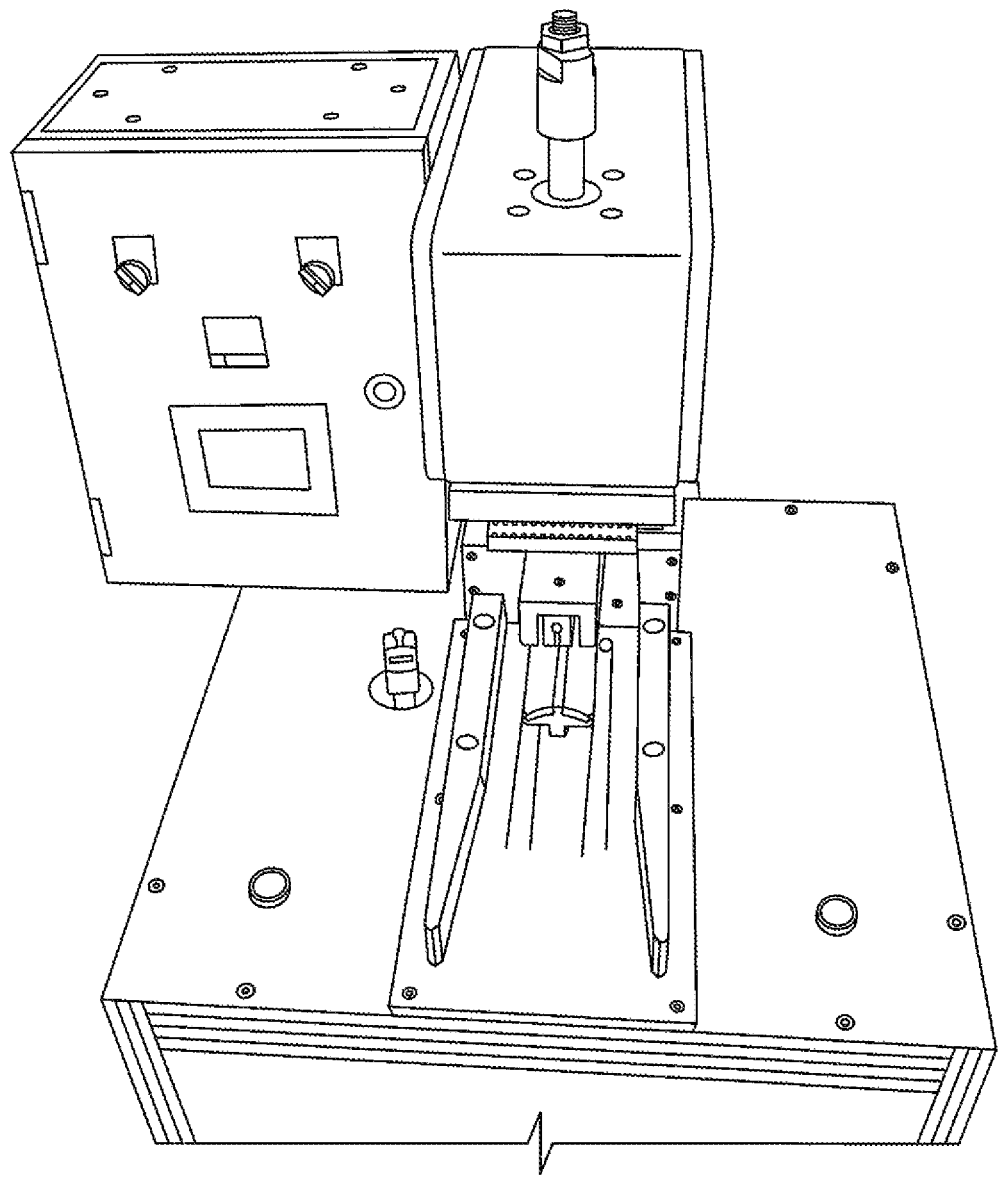
FIG. 6 illustrates a complete view of the welding apparatus 100 shown in FIG. 1.

FIG. 6 illustrates a complete view of the welding apparatus 100.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. In summary, the scope of the invention should not be restricted to the specific exemplary embodiments disclosed herein, and all modifications that are readily suggested to those of ordinary skill in the art should be included within the spirit and scope of the invention.

What is claimed is:

1. A method of welding a thermoplastic sheet, having a first side and a second side, into a cylinder, the method comprising the steps of:
    folding the thermoplastic sheet into a cylinder such that the first side and second side overlap;
    positioning the thermoplastic sheet in a cylinder tube having a longitudinal opening such that the overlapping portions of the first and second sides of the thermoplastic sheet are aligned with the longitudinal opening;
    activating a heat welder so that a press of the heat welder moves into the longitudinal opening of the cylinder tube and presses the thermoplastic sheet against an opposing surface to weld the overlapping portions of the first and second sides; and
    injecting cooling air into the cylinder tube while the thermoplastic sheet is pressed against the opposing surface for welding.

2. The method of claim, 1 wherein the opposing surface is heated.

3. The method of claim 1, wherein the thermoplastic sheet is polyethylene terephthalate (PET), polyethylene terephthalate glycol (PETG), polyethylene terephthalate glycol recycling (PETGR), or polyethylene terephthalate glycol recycling glycol (PETGRG).

4. The method of claim 1, wherein the longitudinal opening of the cylinder tube is the length of the cylinder tube.

5. The method of claim 4, wherein the longitudinal opening is a width larger than the width of the press.

6. The method of claim 1, wherein the opposing surface is heated to 250 degrees Fahrenheit to 750 degrees Fahrenheit.

7. The method of claim 1, wherein the press presses the thermoplastic sheet against the opposing surface for one to twenty seconds.

8. The method of claim 1, wherein the time of injecting cool air is one to ten seconds.

9. The method of claim 2 wherein the opposing surface includes a polytetrafluoroethylene (PTFE) primer layer.

* * * * *